United States Patent
Atake (10) Patent No.: US 12,434,747 B2
(45) Date of Patent: Oct. 7, 2025

(54) RAIL-GUIDED VEHICLE

(71) Applicant: Murata Machinery, Ltd., Kyoto (JP)

(72) Inventor: Hidekazu Atake, Ise (JP)

(73) Assignee: Murata Machinery, Ltd., Kyoto (JP)

( * ) Notice: Subject to any disclaimer, the term of this patent is extended or adjusted under 35 U.S.C. 154(b) by 846 days.

(21) Appl. No.: 17/704,516

(22) Filed: Mar. 25, 2022

(65) Prior Publication Data
US 2022/0324494 A1    Oct. 13, 2022

(30) Foreign Application Priority Data

Apr. 13, 2021  (JP) ................... 2021-067596

(51) Int. Cl.
B61K 9/08 (2006.01)

(52) U.S. Cl.
CPC ..................... B61K 9/08 (2013.01)

(58) Field of Classification Search
CPC . B61K 9/08; B65G 1/00; B65G 49/07; B65G 35/00
See application file for complete search history.

(56) References Cited

U.S. PATENT DOCUMENTS

| | | | | |
|---|---|---|---|---|
| 2011/0251735 A1* | 10/2011 | Hayashi | ............ | H01L 21/67733 701/2 |
| 2016/0276191 A1* | 9/2016 | Kinugawa | ......... | H01L 21/67259 |
| 2018/0148076 A1* | 5/2018 | Chien | ..................... | B61B 13/00 |
| 2020/0381277 A1* | 12/2020 | Li | ............................ | B66C 13/18 |
| 2022/0324494 A1* | 10/2022 | Atake | ........................ | B61B 3/02 |
| 2023/0257004 A1* | 8/2023 | Atake | ........................ | B61B 1/00 104/91 |
| 2024/0199097 A1* | 6/2024 | Ogawa | .................... | B61L 23/00 |

FOREIGN PATENT DOCUMENTS

| | | | |
|---|---|---|---|
| CN | 207657835 U | 7/2018 | |
| JP | 2007-209064 A | 8/2007 | |
| JP | 2011-221687 A | 11/2011 | |
| JP | 7380637 B2 * | 11/2023 | ............ B61B 13/04 |
| TW | 201641412 A | 12/2016 | |
| TW | 201819270 A | 6/2018 | |
| WO | 2019/155627 A1 | 8/2019 | |

OTHER PUBLICATIONS

Office Action dated Oct. 30, 2024, of counterpart Taiwanese Patent Application No. 111113609 along with an English translation.
Notice of Reasons for Refusal dated May 30, 2023, of counterpart Japanese Patent Application No. 2021-067596, along with an English translation.

* cited by examiner

*Primary Examiner* — Jason C Smith
(74) *Attorney, Agent, or Firm* — DLA Piper LLP (US)

(57) ABSTRACT

A rail-guided vehicle is capable of accurately determining an abnormality of a position of rail peripheral equipment. The rail-guided vehicle travels along a rail. The rail-guided vehicle is provided with: a vehicle body including a body part and a traveling part; a light projecting/receiving sensor and contact type sensors provided in the vehicle body that each detect a position of rail peripheral equipment; and a length measuring sensor that measures behavior of the vehicle body at the time of detection of the rail peripheral equipment by the light projecting/receiving sensor and the contact type sensors.

13 Claims, 6 Drawing Sheets

RAIL-GUIDED VEHICLE

TECHNICAL FIELD

This disclosure relates to a rail-guided vehicle.

BACKGROUND

As a technique related to a rail-guided vehicle, Japanese Unexamined Patent Publication No. 2007-209064 discloses a rail inspection vehicle that travels along a rail. The rail inspection vehicle of Japanese Unexamined Patent Publication No. 2007-209064 includes a position detection unit (a detection device) that detects a position of a feeder (rail peripheral equipment) laid along a rail.

As described above, it is possible to determine whether the position of the rail peripheral equipment is normal (determine whether the position is a regular position) on the basis of a detection result of the detection device. However, with the detection device being provided in a vehicle body of the rail-guided vehicle, a relative position of the rail peripheral equipment with respect to the vehicle body changes depending on, for example, behavior (a change in orientation) of the vehicle body and, hence, an erroneous determination might be made when the position of the rail peripheral equipment is abnormal even though there is no actual problem.

It could therefore be helpful to provide a rail-guided vehicle capable of accurately determining an abnormality of a position of rail peripheral equipment.

SUMMARY

My rail-guided vehicle travels along a rail, the rail-guided vehicle including: a vehicle body; a detection device provided in the vehicle body that detects a position of rail peripheral equipment; and a measurement device that measures behavior of the vehicle body at a time of detection of the rail peripheral equipment by the detection device.

The measurement device measures the behavior of the vehicle body at the time of detection of the rail peripheral equipment by the detection device. Therefore, by considering a measurement result of the measurement device, it is possible to distinguish whether or not a detection result of the detection device is mainly caused by the behavior of the vehicle body. That is, even when a relative position of the rail peripheral equipment with respect to the vehicle body changes due to the behavior of the vehicle body, it is possible to accurately determine an abnormality of the position of the rail peripheral equipment.

The measurement device may include a length measuring sensor provided in the vehicle body that measures a distance to the rail. In this example, the behavior of the vehicle body can be measured with a simple configuration.

The length measuring sensor may be disposed on at least one of a front side in a traveling direction and a rear side in the traveling direction of the vehicle body. For example, each of forward inclination and rearward inclination of the vehicle body easily appears in a detection value in the length measuring sensor. It is thus possible to efficiently consider each of the forward inclination and the rearward inclination of the vehicle body as the behavior of the vehicle body.

The rail peripheral equipment may include a feeder laid along the rail. In this example, it is possible to accurately determine looseness of the feeder or the like as the abnormality of the position of the rail peripheral equipment.

The rail peripheral equipment may include a magnetic plate disposed in an upper portion of the rail. In this example, it is possible to accurately determine hanging or the like of the magnetic plate as the abnormality of the position of the rail peripheral equipment.

The rail peripheral equipment may include an induction line plate disposed in a lower portion of the rail. In this example, it is possible to accurately determine hanging or the like of the induction line plate as the abnormality of the position of the rail peripheral equipment.

The detection device may include a light projecting/receiving sensor. In this example, the position of the rail peripheral equipment can be detected using the light projecting/receiving sensor.

The detection device may include a contact type sensor. In this example, the position of the rail peripheral equipment can be detected using the contact type sensor.

The rail-guided vehicle may include an evaluator that evaluates a detection result of the detection device on the basis of a measurement result of the measurement device. Thereby the detection result of the detection device can be evaluated in accordance with the behavior of the vehicle body.

The evaluator may take a factor of the detection result of the detection device as a first factor when a variation in the measurement result of the measurement device is larger than a threshold, and the evaluator may take the factor of the detection result of the detection device as a second factor when the variation in the measurement result of the measurement device is equal to or smaller than the threshold. In this example, when the measurement result of the measurement device is mainly caused by the behavior of the vehicle body, the factor can be evaluated as a first factor and, otherwise, the factor can be evaluated as a second factor.

It is possible to provide a rail-guided vehicle capable of accurately detecting a position abnormality of rail peripheral equipment.

DETAILED DESCRIPTION

An example of my vehicles will be hereinafter described in detail with reference to the accompanying drawings. In descriptions of the drawings, the same elements are provided with the same reference numerals, and a repeated description is omitted.

Figure 1:
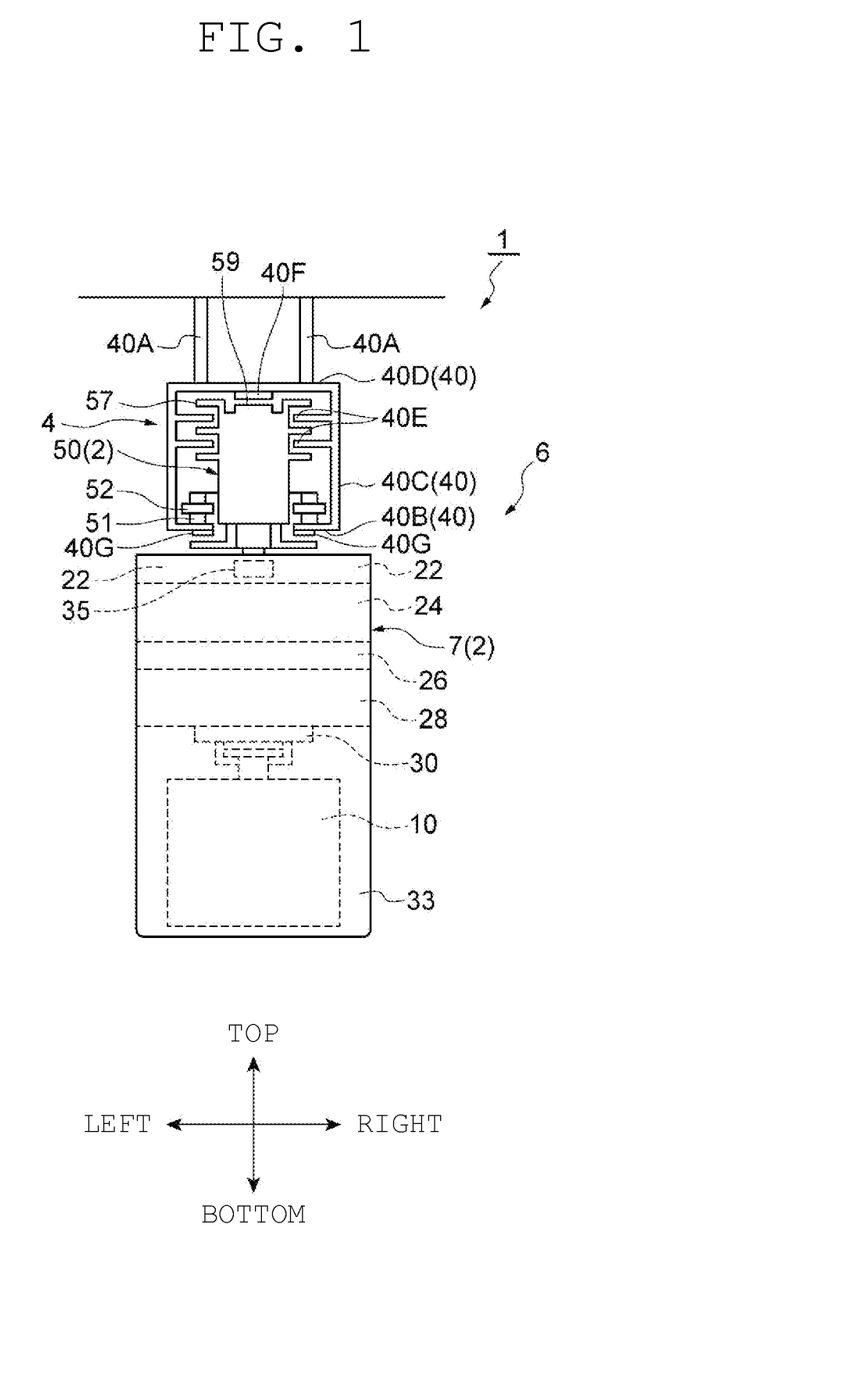
FIG. 1 is a schematic front view illustrating a transport vehicle system including a rail-guided vehicle according to an example.
Figure 2:
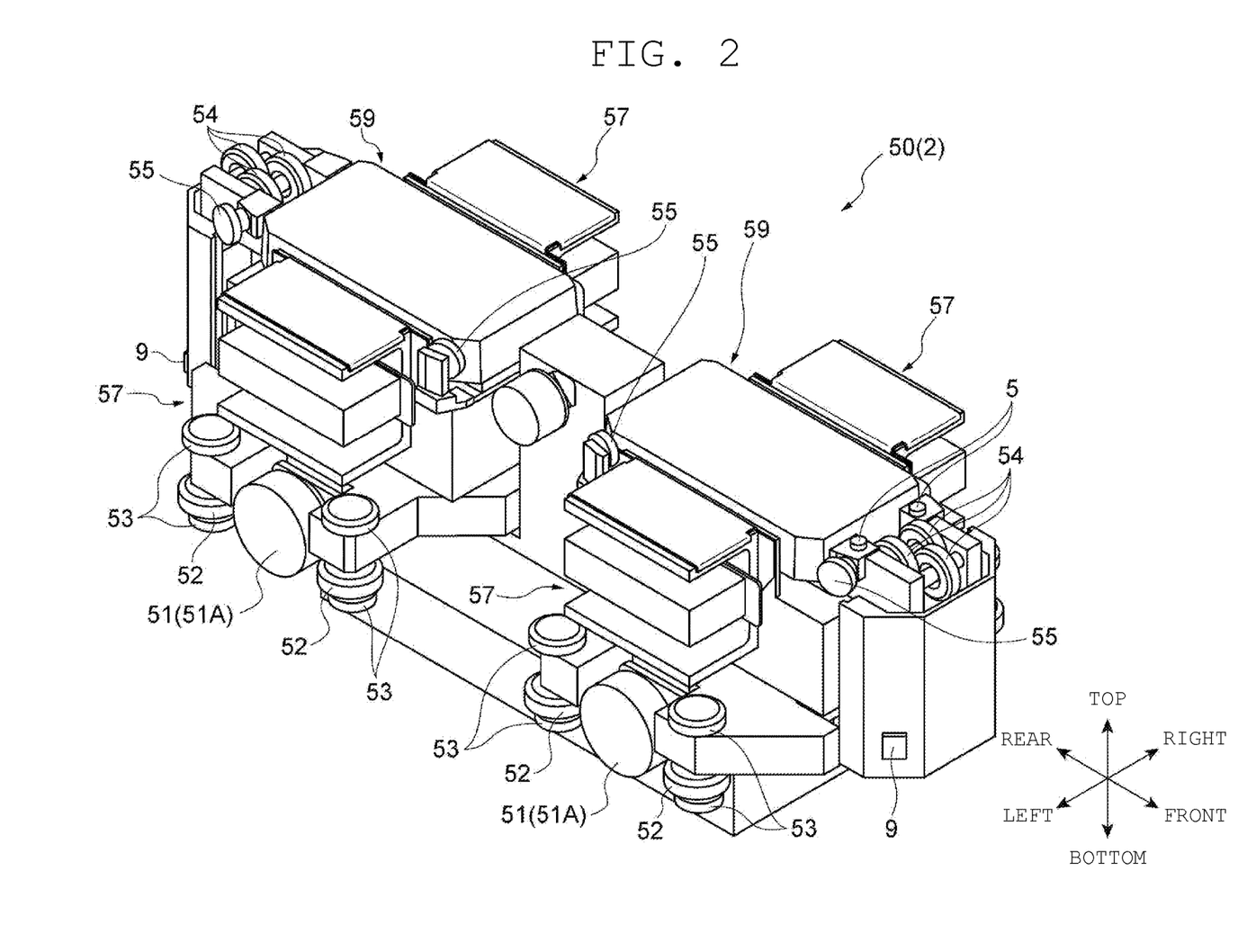
FIG. 2 is a perspective view illustrating a traveling part of the rail-guided vehicle of FIG. 1.
Figure 3:
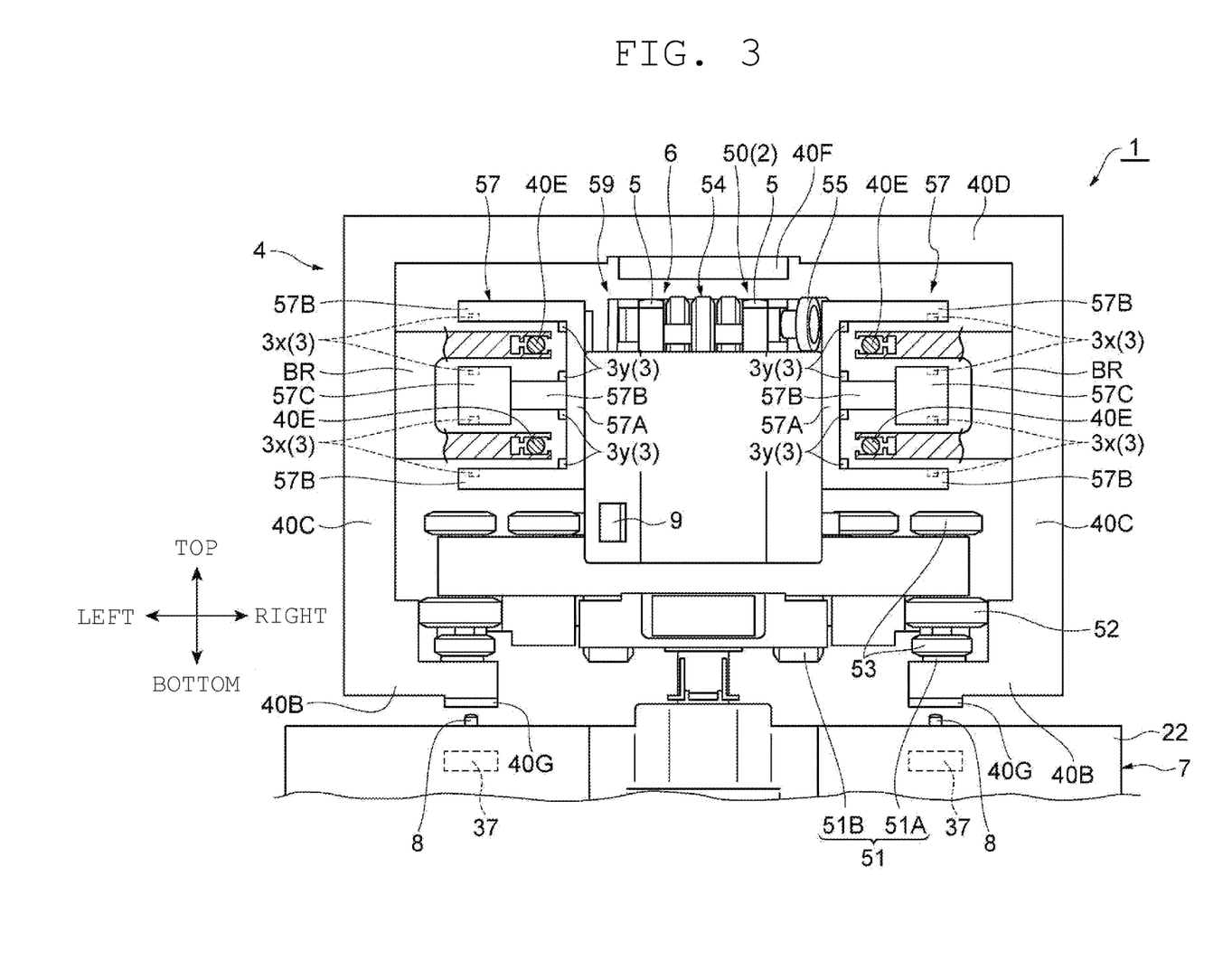
FIG. 3 is a front view illustrating the traveling part of the rail-guided vehicle of FIG. 1 and a peripheral configuration thereof.

FIG. 1 is a schematic front view illustrating a transport vehicle system 1 including a rail-guided vehicle 6. FIG. 2 is a perspective view illustrating a traveling part 50 of the rail-guided vehicle 6. FIG. 3 is a front view illustrating the traveling part 50 of the rail-guided vehicle 6 and a peripheral configuration thereof. FIG. 1 illustrates the schematic configuration of the transport vehicle system 1 when viewed from a traveling direction of the rail-guided vehicle 6. In FIG. 3, a part of the drawing is illustrated in a cross section. For convenience of description, "upper", "lower", "left", "right", "front", and "rear" directions are defined.

As illustrated in FIGS. 1, 2, and 3, the transport vehicle system 1 is a system that transports an article 10 between a plurality of placement parts by using the rail-guided vehicle 6 traveling along a rail 4. The article 10 includes, for example, a container such as a front opening unified pod (FOUP) that stores a plurality of semiconductor wafers and a reticle pod that stores a glass substrate, general components and the like. The placement part includes a buffer and a delivery port disposed along the rail 4. The buffer is a placement part that temporarily stores the article 10. The delivery port is a placement part that passes and receives the article 10 to and from a semiconductor processing device (not illustrated), for example.

A description will be given with the transport vehicle system 1, where, for example, in a factory or the like, the rail-guided vehicle 6 travels along the one-way rail 4 arranged on a ceiling or the like of the factory. The transport vehicle system 1 includes the rail 4 and a plurality of rail-guided vehicles 6.

The rail 4 is arranged, for example, near the ceiling, which is an overhead space of an operator. The rail 4 is suspended from the ceiling, for example. The rail 4 is a predetermined traveling path that allows the rail-guided vehicle 6 to travel. The rail 4 is supported by columns 40A, 40A. The rail 4 includes a tubular rail body part 40 including a pair of lower surfaces 40B, a pair of side surfaces 40C, 40C, and a top surface 40D, a feeder 40E, a magnetic plate 40F, and an induction line plate 40G. The lower surface 40B extends in the traveling direction of the rail-guided vehicle 6 and constitutes a lower surface of the rail body part 40. The lower surface 40B is a plate-shaped member that causes a traveling roller 51 of the rail-guided vehicle 6 to roll and travel. The side surface 40C extends in the traveling direction of the rail-guided vehicle 6 and constitutes a side surface of the rail body part 40. The top surface 40D extends in the traveling direction of the rail-guided vehicle 6 and constitutes an upper surface of the rail body part 40.

The feeder 40E is a portion that feeds power to a feeding core 57 of the rail-guided vehicle 6 and transmits and receives signals to and from the rail-guided vehicle 6. The feeder 40E is fixed to each of the pair of side surfaces 40C, 40C via a bracket BR and extends along the traveling direction. A feeding part 47 feeds power to the power feeding core 57 in a non-contact state. The magnetic plate 40F generates a magnetic force for traveling or stopping in a linear DC motor (LDM) 59 of the rail-guided vehicle 6. The magnetic plate 40F is fixed to the top surface 40D (an upper portion of the rail 4) and extends along the traveling direction.

The induction line plate 40G is, for example, a plate-shaped sensor having a communication line built therein. The induction line plate 40G communicates with an induction core 37, described later, of the rail-guided vehicle 6. The induction line plate 40G is used to determine which of the plurality of rail-guided vehicles 6 will enter first at a merging part of the rail 4. The induction line plate 40G is fixed to the lower surface 40B (a lower portion of the rail 4). Each of the feeder 40E, the magnetic plate 40F, and the induction line plate 40G constitutes rail peripheral equipment (hereinafter, the feeder 40E, the magnetic plate 40F, and the induction line plate 40G are referred to as "rail peripheral equipment").

The rail-guided vehicle 6 travels along the rail 4 and conveys the article 10. The rail-guided vehicle 6 is configured to be able to transfer the article 10. The rail-guided vehicle 6 is an overhead traveling automated transport vehicle. The number of the rail-guided vehicles 6 included in the transport vehicle system 1 is not particularly limited. The rail-guided vehicle 6 includes a body part 7 and the traveling part 50 constituting a vehicle body 2, and a controller 35.

As illustrated in FIG. 1, the body part 7 includes a lateral transfer part 24, a θ drive 26, a lift drive part 28, a lift stage 30, a front-rear frame 33, and the induction core 37. The lateral transfer part 24 laterally transfers the θ drive 26, the lift drive part 28, and the lift stage 30 all at once in a direction perpendicular to the traveling direction of the rail 4. The θ drive 26 rotates at least one of the lift drive part 28 and the lift stage 30 within a predetermined angle range in a horizontal plane. The lift drive part 28 lifts and lowers the lift stage 30 by winding or feeding a suspension material such as a belt, a wire, or a rope. The lift stage 30 is provided with a chuck and can freely hold or release the article 10.

A center frame 22 is a frame constituting an upper portion of the body part 7. The front-rear frame 33 is a frame constituting a front portion and a rear portion of the body part 7. The front-rear frame 33 causes a claw (not illustrated) or the like to protrude and retract to prevent the article 10 from falling during conveyance. A pair of the induction cores 37 is provided in the center frame 22. One of the pair of induction cores 37 transmits a signal via the induction line plate 40G, and the other of the pair of induction cores 37 receives a signal via the induction line plate 40G.

The traveling part 50 causes the rail-guided vehicle 6 to travel along the rail 4. As illustrated in FIGS. 2 and 3, the traveling part 50 includes a traveling roller 51, a side roller 52, a branch roller 53, an auxiliary roller 54, an inclination roller 55, a feeding core 57, and the LDM 59. In FIG. 1, illustration of the branch roller 53, the auxiliary roller 54, and the inclination roller 55 is omitted.

The traveling roller 51 is a roller pair including an outer ring 51A and an inner ring 51B. The traveling rollers 51 are disposed at both left and right ends in each of the front and rear of the traveling part 50. The traveling roller 51 rolls on the pair of lower surfaces 40B, 40B of the rail 4. The side rollers 52 are disposed to sandwich each of the outer rings 51A of the traveling roller 51 in a front-rear direction. The side roller 52 is provided to be able to contact the side surface 40C of the rail 4. The branch roller 53 is disposed to sandwich each of the side rollers 52 in a vertical direction. The side roller 52 is provided to be able to come into contact with a guide (not illustrated) disposed at a connection, a branch part or the like of the rail 4.

The auxiliary roller 54 is a group of three rollers provided in each of the front of and rear of the traveling part 50. The auxiliary roller 54 is provided to prevent the LDM 59, the feeding core 57 and the like from contacting the magnetic plate 40F disposed on an upper surface of the rail 4 when the traveling part 50 is inclined forward or rearward during traveling due to acceleration/deceleration or the like. The inclination rollers 55 are provided at four corners of the LDM 59. The inclination roller 55 is disposed in an inclined state with respect to the front-rear direction. The inclination roller 55 is provided to prevent inclination due to centrifugal force when the traveling part 50 travels in a curved section.

A pair of the feeding cores 57 is disposed in each of the front and rear of the traveling part 50 to sandwich the LDM 59 in a left-right direction. The feeding core 57 feeds power to the feeding part 47 disposed on the rail 4 in a non-contact manner and transmits and receives various signals in a non-contact manner. The feeding core 57 exchanges signals with the controller 35 (cf. FIG. 1). The feeding core 57 includes a base 57A extending in the vertical direction and three legs 57B extending in a horizontal direction from the base 57A. The feeding core 57 is a core having an E-shaped cross section. The feeding core 57 is formed of, for example, a magnetic material such as ferrite. The central leg 57B constitutes a power receiving coil by winding a copper wire coated with enamel or the like, for example. The central leg 57B has a flange 57C that functions as a stopper for the power receiving coil.

The LDM 59 is provided in each of the front and rear of the traveling part 50. The LDM 59 generates a magnetic force for traveling or stopping with the magnetic plate 40F disposed on the upper surface of the rail 4 by using an electromagnet.

As illustrated in FIG. 1, the controller 35 is an electronic control unit including a central processing unit (CPU), a read-only memory (ROM), a random-access memory (RAM) and the like. The controller 35 controls various operations in the rail-guided vehicle 6. Specifically, the controller 35 controls the traveling part 50, the lateral transfer part 24, the θ drive 26, the lift drive part 28, and the lift stage 30. The controller 35 can be configured as, for example, software in which a program stored in the ROM is loaded onto the RAM and executed by the CPU. The controller 35 may be configured as hardware formed of an electronic circuit or the like. The controller 35 is disposed in the center frame 22, for example. The controller 35 uses the feeder 40E or the like of the rail 4 to communicate with a host controller. The host controller transmits a conveyance command for conveying the article 10 to the rail-guided vehicle 6.

A main part of the rail-guided vehicle 6 of the example will be described.

The rail-guided vehicle 6 includes a light projecting/receiving sensor 3 that detects a position of the feeder 40E, a contact type sensor 5 that detects a position of the magnetic plate 40F, a contact type sensor 8 that detects a position of the induction line plate 40G, and a length measuring sensor 9 that measures behavior of the vehicle body 2. Each of the light projecting/receiving sensor 3 and the contact type sensors 5, 8 constitutes a detection device.

The light projecting/receiving sensor 3 is provided on each of a lower side of the upper leg 57B, upper and lower sides of the central leg 57B, and an upper side of the lower leg 57B in the feeding core 57. The light projecting/receiving sensor 3 includes a light projector 3x that emits light and a light receiver 3y that receives the light emitted by the light projector 3x. The light projector 3x is disposed on a tip side of the leg 57B and emits light toward a base end side of the leg 57B. The light receiver 3y is disposed on the base end side of the leg 57B.

The light projecting/receiving sensor 3 is a sensor that detects the position of the feeder 40E on the basis of an amount of light received by the light receiver 3y, which changes when the light from the light projector 3x is blocked or reflected by the feeder 40E (a detection object). The light projecting/receiving sensor 3 is disposed such that its optical axis extends along the leg 57B of the feeding core. The optical axis of the light projecting/receiving sensor 3 is set at a position where the optical axis is blocked by the feeder 40E when the feeder 40E comes into contact with or approaches the leg 57B by a certain amount or more. The position of the feeder 40E to be detected is a relative position with respect to the rail-guided vehicle 6.

When the feeder 40E is at a regular position (normal position), as a result of light from the light projector 3x being received by the light receiver 3y without being blocked by the feeder 40E, the light projecting/receiving sensor 3 as thus described does not detect the feeder 40E (i.e., detects that the feeder 40E is at the regular position). On the other hand, when the feeder 40E is at an abnormal position (a position deviating from the regular position), as a result of the light from the light projector 3x being blocked by the feeder 40E and not received or partially received, the light projecting/receiving sensor 3 detects the position of the feeder 40E (i.e., detects that the feeder 40E is at the abnormal position). The light projecting/receiving sensor 3 is not particularly limited, and various light projecting/receiving sensors can be used.

The contact type sensor 5 is provided at a position below the magnetic plate 40F in the upper portion of the traveling part 50. The contact type sensor 5 faces a lower surface of the magnetic plate 40F when the rail-guided vehicle 6 travels along the rail 4. The contact type sensor 5 is a sensor that detects the position of the magnetic plate 40F by its contact directly touching the magnetic plate 40F (a detection object). The contact type sensor 5 is configured to protrude upward. A predetermined gap is provided between the contact of the contact type sensor 5 and the magnetic plate 40F. A pair of the contact type sensors 5 is provided on the left and right sides around the auxiliary roller 54 and the inclination rollers 55 in the front portion of the traveling part 50. The position of the magnetic plate 40F to be detected is a relative position with respect to the rail-guided vehicle 6.

When the magnetic plate 40F is at a regular position, as a result of the contact not coming into contact with the magnetic plate 40F, the contact type sensor 5 as thus described does not detect the magnetic plate 40F (i.e., detects that the magnetic plate 40F is at the regular position). On the other hand, when the magnetic plate 40F is at an abnormal position (e.g., a hanging position), as a result of the contact coming into contact with the magnetic plate 40F, the contact type sensor 5 detects the position of the magnetic plate 40F (i.e., detects that the magnetic plate 40F is at the abnormal position). The contact type sensor 5 is not particularly limited, and various sensors can be used.

The contact type sensor 8 is provided at a position below the induction line plate 40G in the upper portion of the body part 7. The contact type sensor 8 faces a lower surface of the induction line plate 40G when the rail-guided vehicle 6 travels along the rail 4. The contact type sensor 8 is a sensor that detects the position of the induction line plate 40G by its contact directly touching the induction line plate 40G (a detection object). The contact type sensor 8 is configured to protrude upward. A predetermined gap is provided between the contact of the contact type sensor 8 and the induction line plate 40G. A pair of the contact type sensors 8 is provided on the left and right on the center frame 22. The position of the induction line plate 40G to be detected is a relative position with respect to the rail-guided vehicle 6.

When the induction line plate 40G is at a regular position, as a result of the contact not coming into contact with the induction line plate 40G, the contact type sensor 8 as thus described does not detect the induction line plate 40G (i.e., detects that the induction line plate 40G is at the regular position). On the other hand, when the induction line plate 40G is at an abnormal position (e.g., a hanging position), as a result of the contact coming into contact with the induction line plate 40G, the contact type sensor 8 detects the position of the induction line plate 40G (i.e., detects that the induction line plate 40G is at the abnormal position). The contact type sensor 8 is not particularly limited, and various sensors can be used.

The length measuring sensor 9 is a measurement device that measures the behavior of the vehicle body 2 when the positions of the feeder 40E, the magnetic plate 40F, and the induction line plate 40G are detected by the light projecting/receiving sensor 3 and the contact type sensors 5, 8. A pair of the length measuring sensors 9 is disposed on the front side and the rear side of the traveling part 50 in the traveling direction. The length measuring sensor 9 measures a distance to the lower surface 40B of the rail 4 as the behavior of the vehicle body 2. The length measuring sensor 9 emits measuring laser light downward and receives reflected light reflected by the lower surface 40B accordingly to obtain the distance to the lower surface 40B. The length measuring sensor 9 is not particularly limited, and various sensors can be used.

The controller 35 acquires and stores detection results from the light projecting/receiving sensor 3 and the contact type sensors 5, 8. The controller 35 acquires and stores a measurement result from the length measuring sensor 9. The controller 35 may display the detection results of the light projecting/receiving sensor 3 and the contact type sensors 5, 8 and the measurement result of the length measuring sensor 9 on, for example, a display (not illustrated). The controller 35 may transmit the detection results of the light projecting/receiving sensor 3 and the contact type sensors 5, 8 and the measurement result of the length measuring sensor 9 to, for example, the host controller.

The controller 35 evaluates the detection results of the light projecting/receiving sensor 3 and the contact type sensors 5, 8 on the basis of the measurement result of the length measuring sensor 9. Specifically, when a variation in the measurement result of the length measuring sensor 9 is larger than a threshold, the controller 35 takes a factor of the detection results of the light projecting/receiving sensor 3 and the contact type sensors 5, 8 as a first factor. When the variation in the measurement result of the length measuring sensor 9 is equal to or smaller than the threshold, the controller 35 takes the factor of the detection results of the light projecting/receiving sensor 3 and the contact type sensors 5, 8 as a second factor. The threshold is determined in advance and stored in the controller 35.

The first factor is a factor indicating that the detection result is mainly caused by the behavior of the vehicle body 2. The first factor is a factor when contribution of the behavior of the vehicle body 2 to the detection result is larger than contribution of a position abnormality of the rail peripheral equipment to the detection result. The second factor is a factor indicating that the detection result is mainly caused by the position abnormality of the rail peripheral equipment. The second factor is a factor when the contribution of the behavior of the vehicle body 2 to the detection result is smaller than the contribution of the position abnormality of the rail peripheral equipment to the detection result. The variation in the detection result of the length measuring sensor 9 is an amount of change per unit time of the detection value of the length measuring sensor 9. When a plurality of length measuring sensors 9 are provided, the variation in the detection result of the length measuring sensor 9 may be obtained on the basis of any of a maximum value, a minimum value, and the average value among variations in a plurality of detection values detected by the length measuring sensors 9.

The controller 35 stores the detection results of the light projecting/receiving sensor 3 and the contact type sensors 5, 8 in association with the factor. The controller 35 may cause, for example, the display to display the detection results of the light projecting/receiving sensor 3 and the contact type sensors 5, 8 in association with the factor. The controller 35 may transmit the detection results of the light projecting/receiving sensor 3 and the contact type sensors 5, 8 to, for example, the host controller in association with the factor.

Next, a description will be given of an example of when the position abnormality of the feeder 40E is determined in the rail-guided vehicle 6 of the example.

Figure 4A:
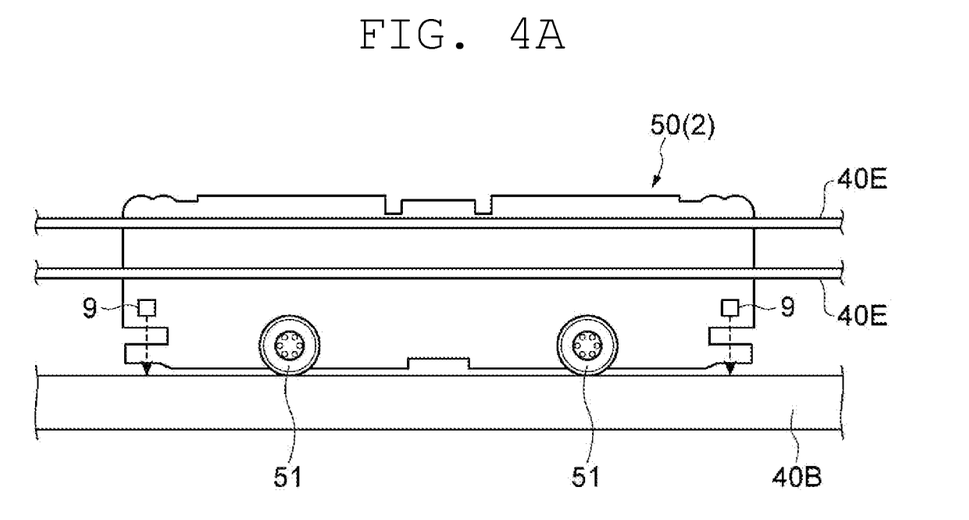
FIG. 4A is a schematic side view of the traveling part and the peripheral configuration thereof explaining as an example when a position abnormality of a feeder is determined.
Figure 4B:
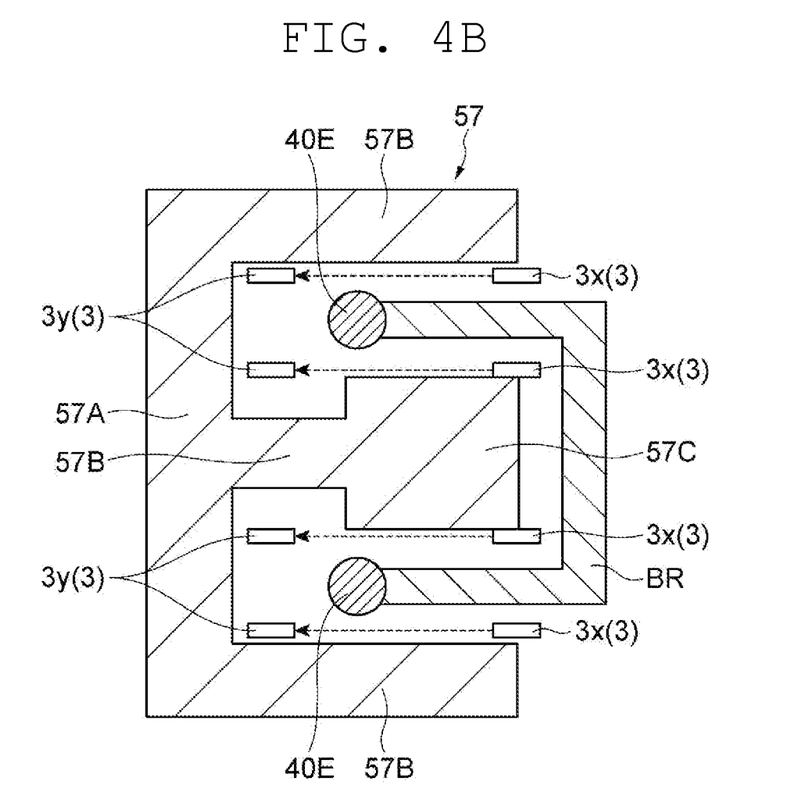
FIG. 4B is a schematic front view illustrating the feeder and the peripheral configuration thereof in the situation of FIG. 4A.

In an example illustrated in FIG. 4A, the lower surface 40B extends along the horizontal direction, the behavior of the vehicle body 2 of the traveling rail-guided vehicle 6 is also stable, and an orientation of the vehicle body 2 is also along the horizontal direction. At this time, as illustrated in FIG. 4B, the feeder 40E does not exist on the optical axis of the light projecting/receiving sensor 3, and the position of the feeder 40E is not detected in the light projecting/receiving sensor 3. In this example, it can be determined that the position of the feeder 40E is the regular position.

Figure 5A:
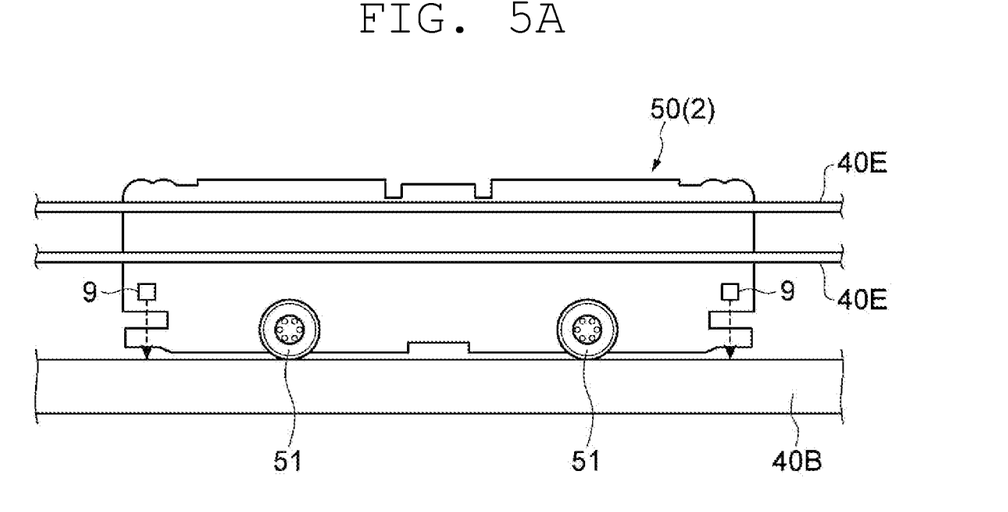
FIG. 5A is a schematic side view of the traveling part and the peripheral configuration thereof explaining as an example when the position abnormality of the feeder is determined.
Figure 5B:
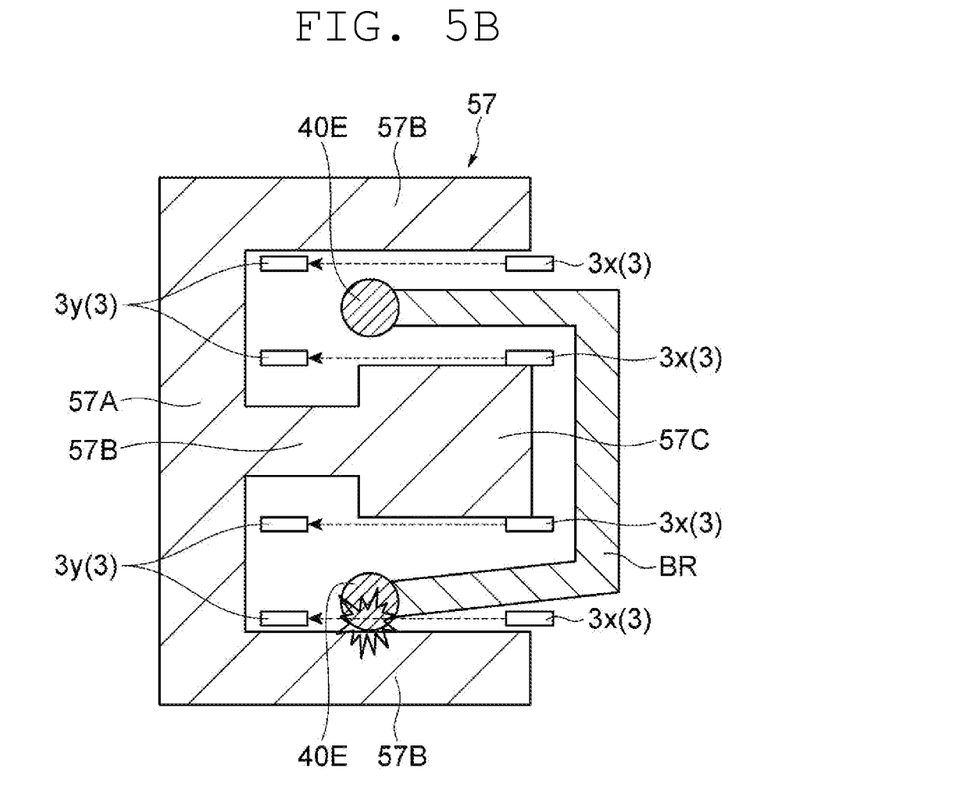
FIG. 5B is a schematic front view illustrating the feeder and the peripheral configuration thereof in the situation of FIG. 5A.

In the example illustrated in FIG. 5A, the lower surface 40B extends along the horizontal direction, the behavior of the vehicle body 2 of the traveling rail-guided vehicle 6 is also stable, and the orientation of the vehicle body 2 is also along the horizontal direction. At this time, as illustrated in FIG. 5B, the feeder 40E exists on the optical axis of the light projecting/receiving sensor 3, and the position of the feeder 40E has been detected in the light projecting/receiving sensor 3. While the behavior of the vehicle body 2 is stable, the variation in the measurement result of the length measuring sensor 9 is equal to or smaller than the threshold, and in this example, the factor of the detection result of the light projecting/receiving sensor 3 is evaluated as the second factor indicating that the detection result is mainly caused by the position abnormality of the rail peripheral equipment. As described above, when the position of the feeder 40E has been detected under the evaluation as the second factor, it can be determined that the looseness of the feeder 40E has occurred and the position of the feeder 40E is abnormal.

Figure 6A:
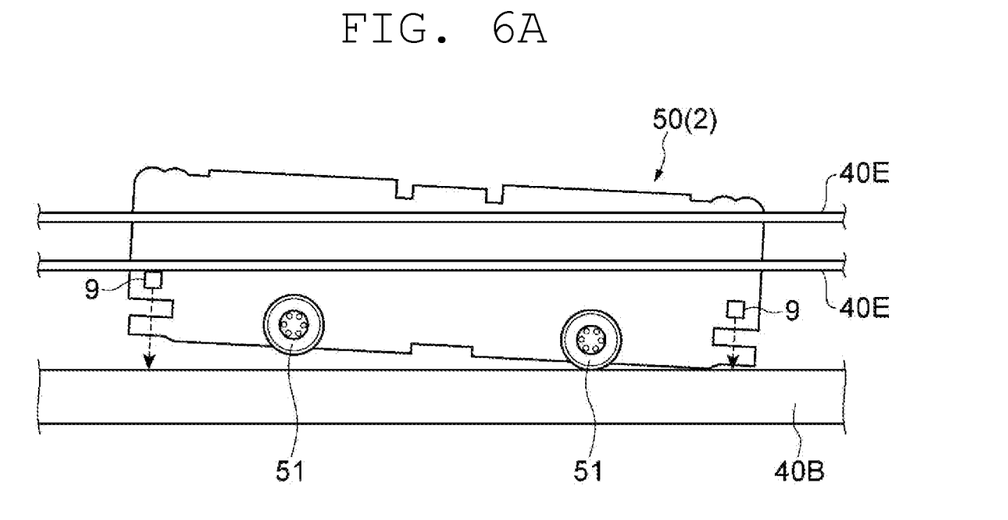
FIG. 6A is a schematic side view of the traveling part and the peripheral configuration thereof explaining as an example when the position abnormality of the feeder is determined.
Figure 6B:
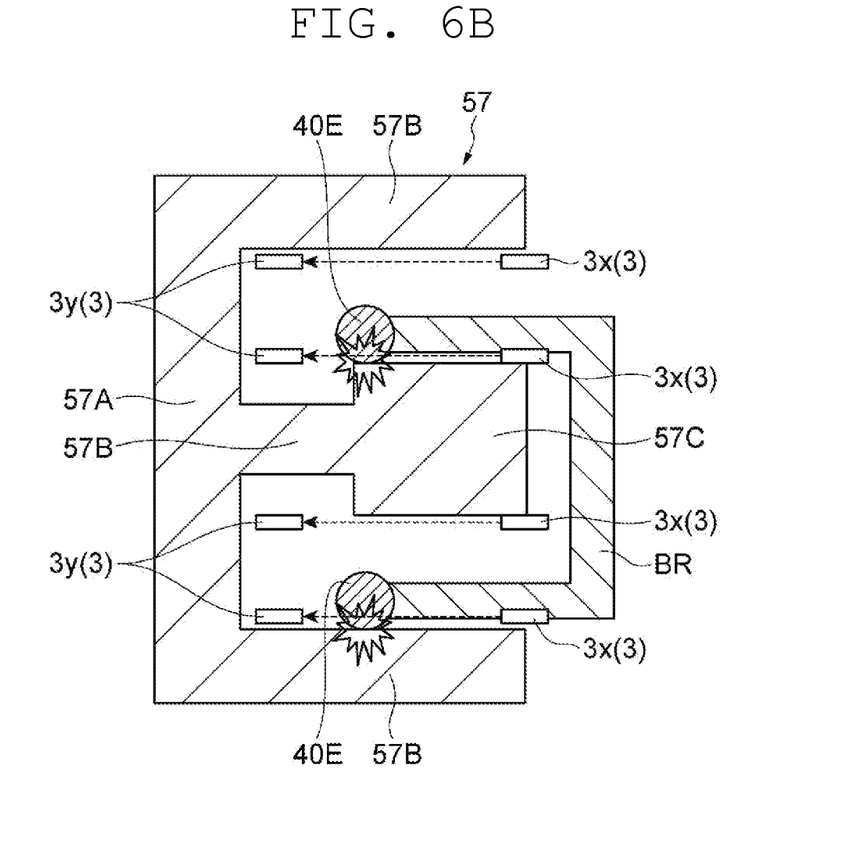
FIG. 6B is a schematic front view illustrating the feeder and the peripheral configuration thereof in the situation of FIG. 6A.

In the example illustrated in FIG. 6A, the lower surface 40B extends along the horizontal direction, but the behavior of the vehicle body 2 of the traveling rail-guided vehicle 6 has varied, and the orientation has changed to incline forward. At this time, as illustrated in FIG. 6B, the feeder 40E exists on the optical axis of the light projecting/receiving sensor 3, and the position of the feeder 40E has been detected in the light projecting/receiving sensor 3. While the behavior of the vehicle body 2 is fluctuating, the variation in the measurement result of the length measuring sensor 9 is larger than the threshold. In this example, the factor of the detection result of the light projecting/receiving sensor 3 is evaluated as the first factor indicating that the detection result is mainly caused by the behavior of the vehicle body 2. As described above, when the position of the feeder 40E has been detected under the evaluation as the first factor, it can be determined that the position of the feeder 40E is not abnormal but the position of the feeder 40E has been detected only due to the behavior of the vehicle body 2, and it can be determined that the position of the feeder 40E is the regular position.

In the above description, the example has been described where the position abnormality of the feeder 40E is determined. However, the same applies when the position abnormality of the magnetic plate 40F is determined and when the position abnormality of the induction line plate 40G is determined. The controller 35 constitutes an evaluator.

As described above, in the rail-guided vehicle 6, the length measuring sensor 9 measures the behavior of the vehicle body 2 at the time of detection of the rail peripheral equipment by the light projecting/receiving sensor 3 and the contact type sensors 5, 8. Therefore, by considering the measurement results of the length measuring sensor 9, it is possible to distinguish whether or not the detection result of the light projecting/receiving sensor 3 and the contact type sensors 5, 8 is mainly caused by the behavior of the vehicle body 2. That is, even when a relative position of the rail peripheral equipment with respect to the vehicle body 2 changes due to the behavior of the vehicle body 2, it is possible to accurately determine an abnormality of the position of the rail peripheral equipment. The contact or the like between the rail peripheral equipment and the vehicle body 2 can be effectively prevented in advance.

The rail-guided vehicle 6 includes the length measuring sensor 9 as a measurement device. In this example, the behavior of the vehicle body 2 can be measured with a simple configuration.

In the rail-guided vehicle 6, the length measuring sensors 9 are disposed on the front side in the traveling direction and the rear side in the traveling direction of the vehicle body 2. For example, each of forward inclination and rearward inclination of the vehicle body 2 easily appears in a detection value in the length measuring sensor 9. It is thus possible to efficiently consider each of the forward inclination and the rearward inclination of the vehicle body 2 as the behavior of the vehicle body 2.

In the rail-guided vehicle 6, the rail peripheral equipment includes the feeder 40E. In this example, the looseness or the like of the feeder 40E can be accurately determined.

In the rail-guided vehicle 6, the rail peripheral equipment includes the magnetic plate 40F. In this example, it is possible to accurately determine hanging or the like of the magnetic plate 40F as the abnormality of the position of the rail peripheral equipment.

In the rail-guided vehicle 6, the rail peripheral equipment includes the induction line plate 40G. In this example, it is possible to accurately determine hanging or the like of the induction line plate 40G as the abnormality of the position of the rail peripheral equipment.

The rail-guided vehicle 6 includes the light projecting/receiving sensor 3 as a detection device. In this example, the position of the rail peripheral equipment can be detected using the light projecting/receiving sensor 3.

The rail-guided vehicle 6 includes the contact type sensors 5, 8 as detection devices. In this example, the position of the rail peripheral equipment can be detected using the contact type sensors 5, 8.

In the rail-guided vehicle 6, the controller 35 evaluates the detection results of the light projecting/receiving sensor 3 and the contact type sensors 5, 8 on the basis of the measurement result of the length measuring sensor 9. It is thereby possible to evaluate the detection results of the light projecting/receiving sensor 3 and the contact type sensors 5, 8 in accordance with the behavior of the vehicle body 2.

In the rail-guided vehicle 6, when a variation in the measurement result of the length measuring sensor 9 is larger than a threshold, a factor of the detection results of the light projecting/receiving sensor 3 and the contact type sensors 5, 8 is taken as a first factor, and when the variation in the measurement result of the length measuring sensor 9 is equal to or smaller than the threshold, the factor of the detection results of the light projecting/receiving sensor 3 and the contact type sensors 5, 8 is taken as a second factor. In this example, when the measurement result of the length measuring sensor 9 is mainly caused by the behavior of the vehicle body 2, the factor can be evaluated as the first factor and, otherwise, the factor can be evaluated as the second factor.

Although one example has been described above, my vehicles are not limited to the above example, and a variety of changes can be made in a range not deviating from the spirit of this disclosure.

In the above example, the rail peripheral equipment is not limited to the feeder 40E, the magnetic plate 40F, or the induction line plate 40G, but may be another equipment provided around the rail 4. In the above example, the detection device is not limited to the light projecting/receiving sensor 3 or the contact type sensors 5, 8 but may be another device so long as the device detects the position of the rail peripheral equipment.

In the above example, the measurement device is not limited to the length measuring sensor 9 but may be another device so long as the device measures the behavior of the vehicle body 2. In the above example, the number of the length measuring sensors 9 is not particularly limited but may be one or three or more. In the above example, the position where the length measuring sensor 9 is disposed is not particularly limited but only needs to be provided in the rail-guided vehicle 6. For example, the length measuring sensors 9 may be disposed on a left side in the traveling direction and a right side in the traveling direction of the vehicle body 2, and the left and right inclinations may be detected as the behavior of the vehicle body 2. Various kinds of behavior of the vehicle body 2 can be considered in the detection results of the light projecting/receiving sensor 3 and the contact type sensors 5, 8 in accordance with the number and placement positions of the length measuring sensors 9.

In the above example, a positional deviation that can occur due to the behavior of the vehicle body 2 may be incorporated in advance in the position of the optical axis of the light projecting/receiving sensor 3, or the positional deviation may not be incorporated. In the above example, when the speed of the rail-guided vehicle 6 is equal to or higher than a constant speed, the detection results of the light projecting/receiving sensor 3 and the contact type sensors 5, 8 are evaluated on the basis of the measurement result of the length measuring sensor 9. On the other hand, when the speed of the rail-guided vehicle 6 is lower than the constant speed, the detection results of the light projecting/receiving sensor 3 and the contact type sensors 5, 8 may not be evaluated on the basis of the measurement result of the length measuring sensor 9 because an adverse effect due to the behavior is small.

The example has been described where my vehicle is applied to the rail 4 for suspension and traveling of the rail-guided vehicle 6, but my vehicles can also be applied to a transport vehicle system in which a transport vehicle travels on a track disposed on the ground.

Various materials and shapes can be applied to each of the configurations in the above example and alternative examples without being limited to the materials and shapes described above. Each configuration in the above example or alternative examples can be arbitrarily applied to each configuration in another example or alternative example. A part of each configuration in the above example or alternative examples can be appropriately omitted without departing from the scope of this disclosure.

What is claimed is:

1. A rail-guided vehicle that travels along a rail, comprising:
   a vehicle body;
   a detection device provided in the vehicle body that detects a position of rail peripheral equipment, wherein the detection device comprises a light projecting/receiving sensor and a contact-type sensor, each configured to detect a position of the same rail peripheral equipment;
   a measurement device that measures behavior of the vehicle body at a time of detection of the rail peripheral equipment by the detection device; and
   an evaluator that evaluates a detection result of the detection device on a basis of a measurement result of the measurement device, and wherein the evaluator confirms an abnormality of the rail peripheral equipment only when both the light projecting/receiving sensor and the contact-type sensor indicate an abnormality.

2. The rail-guided vehicle according to claim 1, wherein the measurement device includes a length measuring sensor provided in the vehicle body that measures a distance to the rail.

3. The rail-guided vehicle according to claim 2, wherein the length measuring sensor is disposed on at least one of a front side in a traveling direction and a rear side in the traveling direction of the vehicle body.

4. The rail-guided vehicle according to claim 2, wherein the rail peripheral equipment includes a feeder laid along the rail.

5. The rail-guided vehicle according to claim 2, wherein the rail peripheral equipment includes a magnetic plate disposed in an upper portion of the rail.

6. The rail-guided vehicle according to claim 2, wherein the rail peripheral equipment includes an induction line plate disposed in a lower portion of the rail.

7. The rail-guided vehicle according to claim 2, wherein, upon confirmation of a position abnormality, the vehicle automatically generates a real-time alert and initiates a predefined response selected from the group consisting of reducing speed, stopping, or notifying a remote system.

8. The rail-guided vehicle according to claim 1, wherein the rail peripheral equipment includes a feeder laid along the rail.

9. The rail-guided vehicle according to claim 1, wherein the rail peripheral equipment includes a magnetic plate disposed in an upper portion of the rail.

10. The rail-guided vehicle according to claim 1, wherein the rail peripheral equipment includes an induction line plate disposed in a lower portion of the rail.

11. The rail-guided vehicle according to claim 1, wherein the detection device includes a light projecting/receiving sensor.

12. The rail-guided vehicle according to claim 1, wherein the detection device includes a contact type sensor.

13. The rail-guided vehicle according to claim 1, wherein
   the evaluator takes a factor of the detection result of the detection device as a first factor when a variation in the measurement result of the measurement device is larger than a threshold, and
   the evaluator takes the factor of the detection result of the detection device as a second factor when the variation in the measurement result of the measurement device is equal to or smaller than the threshold.

* * * * *